United States Patent Office 3,195,013
Patented July 13, 1965

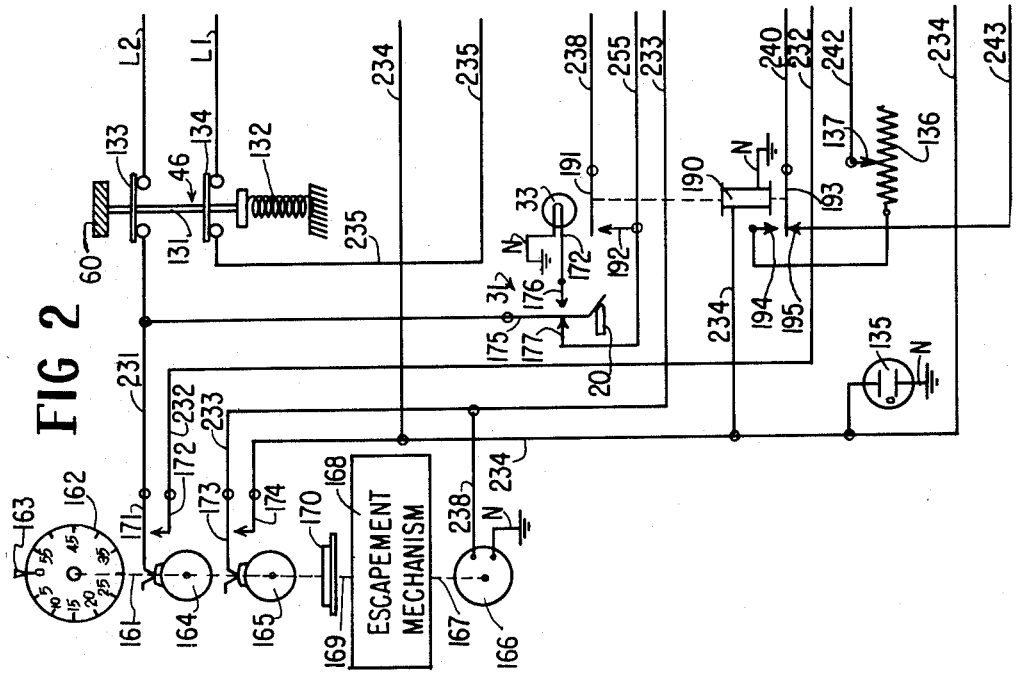
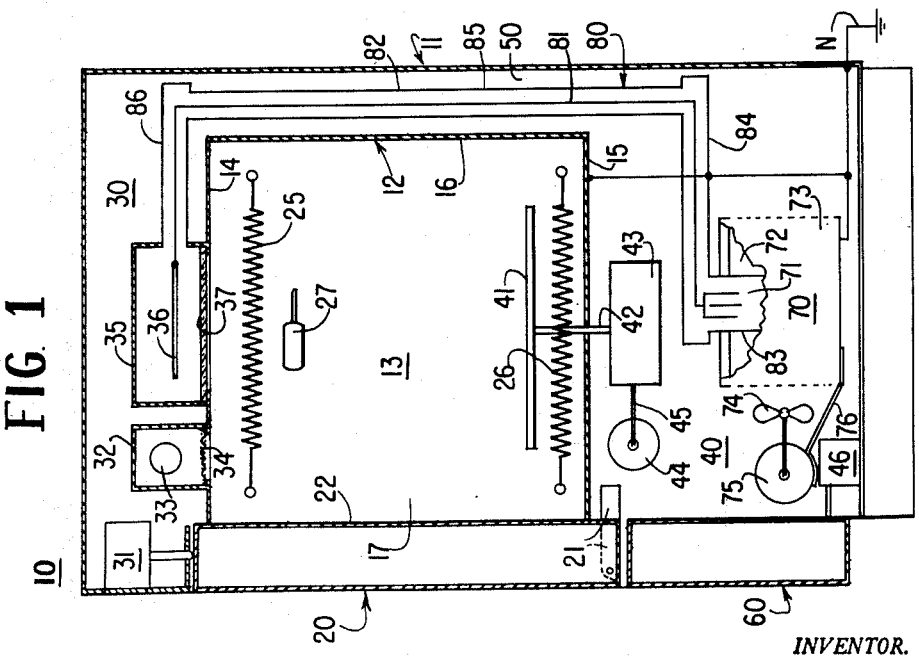

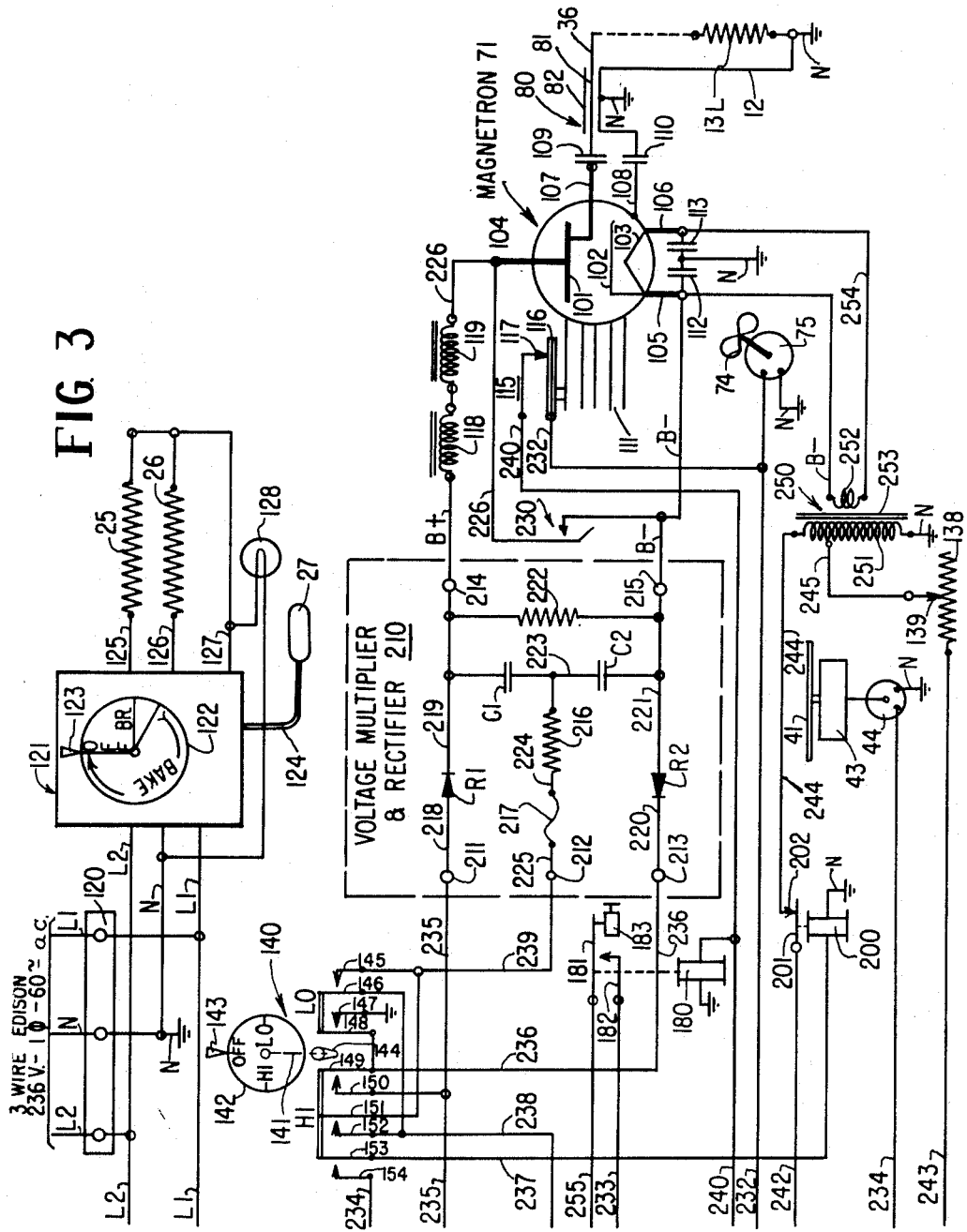

3,195,013
POWER SUPPLY SYSTEMS FOR MAGNETRON DEVICES
Herbert L. Thal, Jr., Rotterdam, N.Y., assignor to General Electric Company, a corporation of New York
Filed May 24, 1962, Ser. No. 197,526
9 Claims. (Cl. 315—205)

The present invention relates to power supply systems for magnetron devices, and more particularly to improved power supply systems of the general character of that disclosed in the copending application of James E. Staats, Serial No. 181,144, filed March 20, 1962.

In the Staats application, there is disclosed a power supply system comprising a 3-wire Edison, low frequency A.C. source, including a pair of ungrounded line conductors and a grounded neutral conductor, a selector switch having "off," "high" and "low" positions, and a voltage doubler and rectifier circuit arranged between the Edison source and the input terminals of the circuit mentioned. The Edison source has a line-to-line R.M.S. voltage of 236 volts and a line-to-neutral R.M.S. voltage of 118 volts. In the "off" position of the selector switch, the Edison source is disconnected from the input terminals of the circuit mentioned; and in the "high" position of the selector switch, the line conductors of the Edison source are respectively connected to the input terminals of the circuit mentioned, and in the "low" position of the selector switch, one of the line conductors and the neutral conductor of the Edison source are respectively connected to the input terminals of the circuit mentioned.

Further, the Staats system comprises a magnetron and structure defining a heating cavity, the output terminals of the circuit mentioned being connected to the input terminals of the magnetron and the output terminals of the magnetron being connected by an asociated transmission line to the heating cavity. When a D.C. plate voltage is applied to the input terminals of the magnetron, the same oscillates at an ultra-high frequency of about 915 mc., whereby R.F. power is supplied from the output terminals thereof via the transmission line to the heating cavity.

The circuit mentioned is operative to produce at the output terminals thereof a D.C. output voltage (open-circuit) that is approximately equal to twice the peak voltage of the A.C. input voltage applied to the input terminals thereof; whereby this open-circuit output voltage is approximately 2 (141%) 236 or 664 volts D.C., with the seelctor switch in its "high" position; and whereby this open-circuit output voltage is approximately 2 (141%) 118 or 332 volts D.C., with the selector switch in its "low" position. This high output voltage of the circuit mentioned, under the load of the magnetron is reduced to a plate voltage of about 600 volts D.C.; and this low output voltage of the circuit mentioned under the load of the magnetron, is reduced to a plate voltage of about 270 volts D.C. The magnetron is operative to supply high R.F. power (about 700 watts) to the heating cavity in response to the application thereto of the high plate voltage of 600 volts D.C.; and the magnetron is operative to supply low R.F. power (about 100 watts) to the heating cavity in response to the application thereto of the low plate voltage of 270 volts D.C.; which operating characteristics are inherent in the magnetron.

In the Staats system, the heating cavity comprises a cooking cavity in an electronic cooking apparatus especially designed for home use, and while the supply of 700 watts of R.F. power to the cooking cavity is quite satisfactory for the purpose of carrying out cooking operations therein at a high cooking rate, the supply of 100 watts of R.F. power to the cooking cavity is too low for the purpose of carrying out cooking operations therein at a satisfactory low cooking rate. However, the supply of 100 watts of R.F. power to the cooking cavity is adequate for the purpose of carrying out warming operations therein at a very low cooking rate.

Accordingly, it is a general object of the present invention to provide a power supply system of the character described that incorporates a voltage multiplier and rectifier circuit of improved connection and arrangement that is selectively operative to supply respective high and low D.C. plate voltages to the associated magnetron, so that the magnetron is correspondingly selectively operative to supply R.F. power to the associated cooking cavity at respective high and low rates in order to effect corresponding electronic cooking operations in the cooking cavity at respective high and low cooking rates that are entirely adequate for home use.

Another object of the invention is to provide in a power supply system of the character described, a voltage multiplier and rectifier circuit that is supplied by an associated 3-wire Edison, low frequency, A.C. source having a line-to-neutral peak voltage of V and a line-to-line peak voltage of 2V, wherein the circuit has a high setting supplying a high D.C. output voltage of approximately 4V and a low setting supplying a low D.C. output voltage of approximately 3V.

A further object of the invention is to provide a voltage multiplier and rectifier circuit of the character described, wherein the circuit may be readily switched between its respective high and low settings by an associated selector switch having respectively corresponding high and low positions.

A still further object of the invention is to provide a voltage multiplier and rectifier circuit of the character described that is of simple connection and arrangement, incorporating no transformers or other expensive components.

Further features of the invention pertain to the particular arrangements of the elements of the power supply circuit for the magnettron, whereby the above-outlined and additional operating features thereof are attained.

The invention, both as to its organization and method of operation, together with further objects and advantages thereof, will best be understood by reference to the following specification, taken in connection with the accompanying drawings, in which:

FIGURE 1 is a diagrammatic vertical sectional view of electronic heating apparatus incorporating a magnetron as well as a control and power supply circuit thereof, embodying the present invention; and FIGS. 2 and 3, taken together, are a diagrammatic illustration of the control and power supply system that is incorporated in the electronic heating apparatus of FIG. 1.

Referring now to FIG. 1 of the drawings, the electronic heating apparatus 10 there illustrated and embodying the features of the present invention is in the form of a combination electric and electronic range that is especially designed for home use. More particularly, the range 10 comprises an upstanding substantially box-like casing 11 formed of steel and housing in the upper central portion thereof a metal liner 12 defining a heating cavity 13 therein. Also, the metal liner 12 may be formed of steel and essentially comprises a box-like structure provided with a top wall 14, a bottom wall 15, a rear wall 16 and a pair of opposed side walls 17, whereby the liner 12 is provided with an upstanding front opening into the heating cavity 13 defined therein. Further, the casing 11 is provided with a front door 20 arranged in a front opening formed therein and cooperating with the front opening provided in the liner 12. More particularly, the front door 20 is mounted adjacent to the lower end thereof upon associated hinge structure 21, whereby the front door 20 is movable between a substantially vertical closed position and a substantially horizontal open position with respect to the front opening provided in the liner 12. Also, the front door 20 includes an inner metal sheet 22 that may be formed of steel and that cooperates with the liner 12 completely to close the heating cavity 13 when the front door 20 occupies its closed position.

Also an electric heating unit 25 is arranged in the upper portion of the heating cavity 13 adjacent to and below the top wall 14, and an electric heating unit 26 is arranged in the lower portion of the heating cavity 13 adjacent to and above the bottom wall 15; which electric heating units 25 and 26 are utilized in the carrying out of conventional baking and broiling cooking operations in the cooking cavity 13 in the usual manner. Also a temperature sensing bulb 27 is arranged in a pocket provided in one of the side walls 17; which temperature sensing bulb 27 forms a part of an oven switch and temperature controller that is utilized in carrying out the previously mentioned conventional baking and broiling operations in the heating cavity 13.

An upper machinery compartment 30 is defined between the top wall 14 of the liner 12 and the top wall of the casing 11 and a lower machinery compartment 40 is defined between the bottom wall 15 of the liner 12 and the bottom wall of the casing 11 due to the location of the liner 12 in the upper central portion of the casing 11. Also the rear wall 16 of the liner 12 is spaced forwardly from the rear wall of the casing 11 so as to provide a rear machinery compartment 50 therebetween; which rear machinery compartment 50 communicates at the upper portion thereof with the rear portion of the upper machinery compartment 30 and communicates at the lower portion thereof with the rear portion of the lower machinery compartment 40. Further, the lower front of the casing 11 is provided with a front opening into the lower machinery compartment 40; which front opening is selectively closed by an associated removable lower front panel 60 disposed immediately below the front door 20 and normally closing the open front of the lower machinery compartment 40; which lower front panel 60 is also preferably formed of steel. A door switch 31 is arranged in the upper machinery compartment 30 and is selectively operated in accordance with the position of the front door 20, as explained more fully hereinafter. Also a lamp box 32 formed of sheet steel is arranged in the upper machinery compartment 30; which lamp box 32 is provided with a bottom opening communicating with a cooperating opening formed in the front portion of the top wall 14. The lamp box 32 houses an electric oven lamp 33; and the bottom opening into the lamp box 32 is provided with a reticulated metal screen 34 disposed in covering relation therewith. The reticulated metal screen 34 may be formed of steel wire and is suitably electrically connected to the top wall 14; which reticulated screen 34 is so constructed and arranged that it accommodates illumination of the heating cavity 13 by the electric lamp 33, while preventing the passage of microwave energy into the lamp box 32. Further, a distributing box 35 formed of sheet steel is arranged in the upper machinery compartment 30; which distributing box 35 is provided with a bottom opening communicating with a cooperating opening formed in the central portion of the top wall 14. The distributing box 35 houses an antenna 36 electrically insulated therefrom; and the bottom opening into the distributing box 35 is provided with a glass pane 37 disposed in covering and closing relation therewith. The glass pane 37 is so constructed and arranged that it accommodates the ready passage therethrough of microwave energy from the distributing box 35 into the heating cavity 13 that is radiated from the antenna 36 into the distributing box 35, while preventing the passage of oven gases from the heating cavity 13 into the distributing box 35.

Further, a turntable 41 formed of expanded sheet metal is arranged in the lower portion of the heating cavity 13; which turntable 31 is mounted for rotation upon a cooperating upstanding shaft 42 extending through a cooperating hole provided in the bottom wall 15; and which turntable 41 is adapted to support food to be heated or cooked in the electronic heating operation that is carried out in the heating cavity 13, as explained more fully hereinafter. The lower end of the shaft 42 extends into the lower machinery compartment 40 and is connected to a cooperating reduction gear train 43 also disposed in the lower machinery compartment 40. Further an electric motor 44 is arranged in the lower machinery compartment 40 and is provided with a drive shaft 45 that is operatively connected to the gear train 43. The gear train 43 is so constructed and arranged that normal operation of the electric motor 44 brings about rotation of the turntable 41 at a speed or approximately 1 r.p.m. Further an interlock switch 46 is arranged in the lower front portion of the lower machinery compartment 40 and disposed in cooperating relation with respect to the removable lower front panel 60; whereby the interlock switch 46 is selectively operated by the placement and by the removal of the lower front panel 60, in a manner more fully explained subsequently.

Further, there is arranged in the central portion of the lower machinery compartment 40, a magnetron unit 70 that is preferably of the construction and arrangement of that disclosed in the previously mentioned Staats application. More particularly, the magnetron unit 70 comprises a magnetron device 71, an inner metal box-like construction 72 enclosing the magnetron device 71, and an outer metal box-like construction 73 enclosing the inner box-like construction 72. In the arrangement, the two box-like constructions 72 and 73 are provided with open front and rear ends; and further, the magnetron unit 70 comprises a fan 74 that is arranged adjacent to the front end thereof, the fan 74 being directly driven by an associated electric motor 75. More particularly, the electric motor 75 is supported upon an associated bracket 76 that is directly carried by the outer metal box-like construction 73. Accordingly, operation of the electric motor 75 effects operation of the fan 74 and the consequent direction thereby of a stream of cooling air through the open ended box-like constructions 72 and 73 and the consequent cooling of the magnetron device 71.

Further, the range 10 comprises a coaxial transmission line 80 including an inner conductor 81 and an outer conductor 82, and operatively connecting the magnetron unit 70 to the antenna 36 and to the distributing box 35, so as to supply the microwave energy from the magnetron device 71 to the antenna 36 and thence into the heating cavity 13. Preferably, the transmission line 80 is of the general construction and arrangement of that disclosed in the copending application of Louis H. Fitzmayer, Serial No. 135,582, filed September 1, 1961; whereby the transmission line 80 comprises the four serially connected sections 83, 84, 85 and 86, the sections 83 and 85 having a substantially circular cross section and the sections 84 and 86 having a substantially rectangular cross section. In the arrangement, the sections 83 and 84 are disposed in the lower machinery compartment 40, the section 86 is disposed in the upper machinery compartment 30 and the section 85 is disposed in the rear machinery compartment 50. The lower end of the inner conductor 81 of the transmission line 80 is capacitively coupled to one of the output terminals of the magnetron device 71, while the upper end of the inner conductor 81 is directly connected to the antenna 36; similarly, the lower end of the outer conductor 82 of the transmission line 80 is capacitively coupled to the other output terminal of the magnetron device 71, while the upper end of the outer conductor 82 is directly connected to the distributing box 35. Also, it is noted that in the magnetron unit 70, the inner box-like construction 72 and the outer box-like construction 73 are electrically insulated from each other, the inner box-like construction 72 being electrically connected to the output terminal of the magnetron device 71 that is capacitively coupled to the inner conductor 81 of the transmission line 80 and the outer box-like construction 73 being connected to ground potential by the associated neutral conductor N in the power supply system, as explained more fully hereinafter. Further, it is noted that the outer conductor 82 of the transmission line 80, the liner 12, and the casing 11 are connected to ground potential via the associated neutral conductor N.

Referring now to FIG. 3, the magnetron device 70 essentially comprises an envelope housing an anode 101, a cathode 102 and a cathode heater 103 operatively associated with the cathode 102, the envelope mentioned being evacuated to a high degree. Also, the magnetron device 71 comprises an input terminal 104 operatively connected to the anode 101, an input terminal 105 operatively connected to the cathode 102 and to one terminal of the cathode heater 103, and a cathode heater terminal 106 operatively connected to the other terminal of the cathode heater 103. Further, the magnetron device 71 comprises a pair of output terminals 107 and 108 across which the ultra-high frequency output voltage is developed, the output terminal 107 being capacitively coupled by a capacitor 109 to the inner conductor 81 of the transmission line 80, and the output terminal 108 being capacitively coupled by a capacitor 110 to the outer conductor 82 of the transmission line 80. Further, the magnetron device 71 comprises upper and lower electromagnetic coils 118 and 119 operatively associated with the upper and lower portions of the envelope thereof and connected in series relationship, the adjacent terminals of the coils 118 and 119 being connected together, the other terminal of the coil 118 being connected to a B+ conductor, and the other terminal of the coil 119 being connected to the input terminal 104. Further, in the magnetron device 71, a number of metallic cooling fins 111 are carried by the envelope thereof in good heat-exchange relationship therewith; which cooling fins 111 are operatively associated with the fan 74 that is driven by the associated electric motor 75 for the cooling purpose. The input terminal 105 is connected to a B— conductor; and a pair of capacitors 112 and 113 are bridged in series relationship across the terminals 105 and 106, the junction between the capacitors 112 and 113 being connected to the neutral conductor N. The capacitors 112 and 113 comprise a portion of an arrangement for shunting to ground potential the second and higher harmonics of the fundamental operating frequency of the magnetron device 71 that are produced incident to operation thereof. Finally, a thermostatic switch 115 is carried by the finned structure 111 in good heat-exchange relationship therewith; which thermostatic switch 115 is operative in the event of an abnormally high operating temperature of the magnetron device 71 and for a purpose more fully explained hereinafter. More particularly, the thermostatic switch 115 includes a thermal element 116 that normally engages an associated switch spring 117.

Referring now to FIGS. 2 and 3, the control and power supply system for the range 10 comprises the previously described heating units 25 and 26, the magnetron device 71, the oven lamp 33, the door switch 31, the interlock switch 46, the turntable operating motor 44, the fan operating motor 75 and the thermostatic switch 115, as well as the transmission line 80 extending to the antenna 36 arranged in the distributing box 35 operatively associated with the heating cavity 13. Also the system comprises a 3-wire Edison network of 236 volts, single phase, 60 cycles, A.C. and including two ungrounded line conductors L1 and L2 and a grounded neutral conductor N, the three conductors mentioned being terminated by an associated electrical insulating block 120. The interlock switch 46 includes an electrical insulating operating stem 131 that carries a pair of contact bridging members 133 and 134, the operating stem 131 being biased by an associated coil spring 132 to actuate the contact bridging members 133 and 134 into their open positions when the lower front panel 60 is removed from the associated lower front of the cabinet 11 of the range 10. On the other hand, when the lower front panel 60 is in place, the operating stem 131 is moved by the lower front panel 60 against the bias of the coil spring 132 to actuate the contact bridging members 133 and 134 into their closed positions. The door switch 31 comprises a movable switch spring 175 and a pair of cooperating stationary switch springs 176 and 177. When the front door 20 occupies its closed position, the movable switch spring 175 is actuated to engage the stationary switch spring 177 and to disengage the stationary switch spring 176; on the other hand, when the front door 20 occupies its open position, the movable switch spring 175 is actuated to engage the stationary switch spring 176 and to disengage the stationary switch spring 177.

Further, the system comprises an oven switch and temperature controller 121 of conventional construction and arrangement and including a casing carrying a manually operable dial 122 cooperating with an associated index marker 123. The dial 122 comprises an "off" position, a variable "bake" position corresponding to an operating temperature range, and a "broil" position. The casing houses a power switch, not shown, that is selectively operated by the dial 122 in the corresponding "off," "bake" and "broil" positions. Also the casing houses a temperature control switch, not shown, that is selectively set by the dial 122 and that is selectively operated by the temperature sensing bulb 27 through an associated capillary tube 124. Further, the controller 121 comprises three input terminals to which the line conductors L1 and L2 and the neutral conductor N are respectively connected, as well as three output terminals to which three conductors 125, 126 and 127 are respectively connected. The two terminals of the upper heating unit 25 are respectively connected to the conductors 125 and 127, and the two terminals of the lower heating unit 26 are respectively connected to the conductors 126 and 127.

Further, the system comprises a power selector switch 140 that includes a rotatably mounted operating shaft 141 carrying at the outer end thereof a manually operable dial 142 that cooperates with an associated index marker 143. The power selector switch 140 has an "off" position, a "high" position and a "low" position; and the inner end of the operating shaft 141 carries an electrical insulator 144 that cooperates with a set of high switch springs 149, 150, 151, 152, 153 and 154 and with a set of low switch springs 145, 146, 147 and 148. In the arrangement, when the power selector switch 140 occupies its "off" position, the switch springs 146, 148, 149, 151 and 153 respectively disengage the switch springs 145, 147, 150, 152 and 154. When the power selector switch 140 occupies its "high" position, the switch springs 149, 151 and 153 are actuated to engage the respective switch springs 150, 152 and 154. When the power selector switch 140 occupies its "low" position, the switch springs 146 and 148 are actuated to engage the respective switch springs 145 and 147.

Further, the system comprises a program controller 160 that includes an operating shaft 161 carrying a manually operable dial 162 on the outer end thereof that cooperates with an associated index marker 163, the manual dial 162 being calibrated in terms of minutes of cooking time of operation of the magnetron device 71, as explained more fully hereinafter. Also, the operating shaft 161 carries two insulating cams 164 and 165 that respectively cooperate with two movable switch springs 171 and 173; which switch springs 171 and 173 respectively cooperate with two stationary switch springs 172 and 174. Also, the program controller 160 comprises an electric timer motor 166 that is preferably of the "Telechron" type and that is provided with an operating shaft 167 that is connected to a conventional escapement mechanism 168. In turn, escapement mechanism 168 is provided with an operating shaft 169; and the adjacent ends of the operating shafts 161 and 169 are operatively connected by an associated friction clutch 170.

Considering now the general mode of operation of the program controller 160, when the manual dial 162 occupies its "0" time position, the two insulating cams 164 and 165 respectively actuate the two movable switch springs 171 and 173 so as to disengage the respective stationary switch springs 172 and 174. On the other hand, when the manual dial 162 is selectively and variably operated out of its "0" time position by rotation in the clockwise direction, the two insulating cams 164 and 165 respectively actuate the two movable switch springs 171 and 173 to engage the respective stationary switch springs 172 and 174. Closure of the set of switch springs 173, 174 effects energization of the timer motor 166; whereby the operating shaft 167 is rotated upon a timed basis in the counterclockwise direction so as to cause at spaced time intervals operation of the escapement mechanism 168 to actuate its operating shaft 169 in corresponding small angular steps in the counterclockwise direction. The small angular steps of the operating shaft 169 are transmitted through the clutch 170 to the operating shaft 161, thereby to effect small angular steps of rotation of the operating shaft 161 in the counterclockwise direction; whereby the manual dial 162 is reset in small angular steps on a timed basis back toward its "0" time position. Subsequently, when the manual dial 162 is returned back into its "0" time position, the insulating cams 164 and 165 return the two sets of switch springs 171, 172 and 173, 174 back into their respective open positions; whereby further operation of the timer motor 166 is arrested.

The arrangement of the slip clutch 170 between the adjacent ends of the operating shafts 161 and 169 accommodates relative rotation of the operating shaft 161 under the control of the manual dial 162 and independently of the operating shaft 169 of the escapement mechanism 168. However, the counterclockwise stepped rotation of the operating shaft 169 of the escapement mechanism 168 is transmitted through the slip clutch 170 to the operating shaft 161, so as to reset the manual dial 162 back into its "0" time position, as described above.

Further, the system comprises a voltage multiplier and rectifier circuit 210 that includes three input terminals 211, 212 and 213 and a pair of output terminals 214 and 215, as well as a pair of capacitors C1 and C2 that are preferably of the electrolytic type and a pair of diodes R1 and R2 that are preferably of the silicon-crystal type. Further, the circuit 210 comprises a bleeder or stabilizing resistor 222, a surge limiting resistor 216 and a current protective device in the form of a fuse 217.

In the arrangement of the voltage multiplier and rectifier circuit 210, one terminal of the capacitor C1 is connected by a conductor 219 to the output terminal 214; the other terminal of the capacitor C1 is connected by a conductor 223 to one terminal of the capacitor C2; and the other terminal of the capacitor C2 is connected by a conductor 221 to the output terminal 215. The input terminal 211 is connected by a conductor 218 to the positive pole of the crystal rectifier R1; and the negative pole of the crsytal rectifier R1 is connected to the conductor 219. The input terminal 212 is connected by a conductor 225 to one terminal of the fuse 217; the other terminal of the fuse 217 is connected by a conductor 224 to one terminal of the surge limiting resistor 216; and the other terminal of the surge limiting resistor 216 is connected to the conductor 221. The input terminal 213 is connected by a conductor 220 to the negative pole of the crystal rectifier R2; and the positive pole of the crystal rectifier R2 is connected to the conductor 221. Finally, the terminals of the stabilizing resistor 222 are respectively connected to the conductors 219 and 221; and the three input terminals 211, 212 and 213 respectively terminate three conductors 235, 239 and 236; and the two output terminals 214 and 215 respectively terminate the B+ conductor and the B− conductor.

Further, the system comprises a time delay relay 180, a power relay 190 and a cathode heater relay 200. The time delay relay 180 is of the slow-to-operate type and controls the switch springs 181 and 182, and further comprises a dash pot, or other device, 183 that is operatively connected to the switch spring 181. When the time delay relay 180 occupies its restored position, the switch spring 181 disengages the switch spring 182. When the winding of the time delay relay 180 is energized, the same begins to operate; however, it is not operated into its fully operated position until after a time delay of about 45 seconds, due to the provision of the dash pot 183 in cooperating relation with the switch spring 181; whereby at the expiration of the time interval mentioned and upon full operation of the time delay relay 180, the switch spring 181 engages the switch spring 182. When the winding of the time delay relay 180 is deenergized, the same is immediately restored, so that the switch spring 181 immediately disengages the switch spring 182. The power relay 190 controls a set of switch springs 191 to 195, inclusive. When the power relay 190 occupies its restored position, the switch spring 191 disengages the switch spring 192, the switch spring 193 engages the switch spring 195, and the switch spring 193 disengages the switch spring 194. When the power relay 190 occupies its operated position, the switch spring 191 engages the switch spring 192, the switch spring 193 disengages the switch spring 195, and the switch spring 193 engages the switch spring 194. The cathode heater relay 200 controls a set of switch springs 201 and 202. When the cathode heater relay 200 occupies its restored position, the switch spring 201 engages the switch spring 202. When the cathode heater relay 200 occupies its operated position, the switch spring 201 disengages the switch spring 202.

Further, the system comprises a cathode heater transformer 250 that is provided with a primary winding 251, a secondary winding 252, and an associated iron core 253. Also, the system comprises an oven pilot lamp 128, an ultra-high frequency pilot lamp 135, a shorting switch 230, and two adjustable resistors 136 and 138 that are respectively provided with two cooperating adjustable contacts 137 and 139. Finally, it is noted that the impedance of the heating cavity 13 is represented as comprising the load resistor 13L which is in effect connected between the antenna 36 and the liner 12 that is, in fact, connected to the neutral conductor N.

Considering now the connection of the system, it is noted that the two contacts of the interlock switch 46 that are controlled by the contact bridging member 133 are respectively connected to the line conductor L2 and to a conductor 231; and the two contacts of the interlock switch 46 that are controlled by the contact bridging member 134 are respectively connected to the line conductor L1 and to the conductor 235. In the door switch 31, the switch springs 175, 176 and 177 are respectively connected to the conductor 231, to a conductor 178 and to a conductor 255. In the power selector switch 140, the switch springs 145, 146, 147, 148, 149, 150, 151, 152, 153 and 154 are respectively connected to the conductor 239, to a conductor 238, to the neutral conductor N, to the conductor 236, to the conductor 236, to the conductor 235, to the conductor 239, to the conductor 238, to a conductor 237 and to a conductor 234. The oven lamp 33 is bridged across the neutral conductor N and the conductor 178; the oven pilot lamp 128 is bridged across the neutral conductor N and the conductor 127; and the ultra-high frequency pilot lamp 135 is bridged across the neutral conductor N and the conductor 234.

In the program controller 160, the switch springs 171, 172, 173 and 174 are respectively connected to the conductor 231, to a conductor 232, to a conductor 233, and to the conductor 234. The timer motor 166 is bridged across the neutral conductor N and the conductor 233.

In the time delay relay 180, the switch springs 181 and 182 are respectively connected to the conductors 255 and 233, while the winding thereof is bridged across the neutral conductor N and a conductor 240. In the power relay 190, the switch springs 191, 192, 193, 194 and 195 are respectively connected to the conductor 238, to the conductor 255, to the conductor 240, to a conductor 241 and to a conductor 243, while the winding thereof is bridged across the neutral conductor N and the conductor 234. In the cathode heater relay 200, the switch springs 201 and 202 are respectively connected to a conductor 242 and to a conductor 244, while the winding thereof is bridged across the neutral conductor N and the conductor 237.

The terminal of the resistor 136 is connected to the conductor 241 and the adjustable contact 137 of the resistor 136 is connected to the conductor 242. The terminal of the resistor 138 is connected to the conductor 243 and the adjustable contact 139 of the resistor 138 is connected to a conductor 245.

In the magnetron thermostatic switch 115, the thermal element 116 is connected to the conductor 232 and the switch spring 117 is connected to the conductor 240. The turntable operating motor 44 is bridged across the neutral conductor N and the conductor 234; while the fan operating motor 75 is bridged across the neutral conductor N and the conductor 232. The lower extremity of the primary winding 251 of the cathode heater transformer 250 is connected to the neutral conductor N; the upper extremity of the primary winding 251 is connected to the conductor 244; and the midtip of the primary winding 251 is connected to the conductor 245. The secondary winding 252 of the cathode heater transformer 250 is bridged across the B— conductor and the conductor 254 that is connected to the cathode heater terminal 106 of the magnetron device 71. Finally, the two terminals of the shorting switch 230 are respectively connected to the B— conductor and to the conductor 226.

Considering now the carrying out of a conventional electric baking operation in the range 10, the cook places the food to be cooked in the heating cavity 13 and then rotates the manual dial 122 of the oven switch and temperature controller 121 out of its "off" position into its variable "bake" position and corresponding to the temperature that is to be maintained in the heating cavity 13. This operation of the manual dial 122 actuates the power switch, not shown, housed in the casing, whereby the line conductors L1 and L2 and the neutral conductor N are respectively connected to the conductors 127, 126 and 125, with the result that the lower heating unit 26 is energized across the 236 volts of the Edison network, and the upper heating unit 25 is energized across the 118 volts of the Edison network. Also, this operation of the manual dial 122 preselects the temperature that is to be maintained in the heating cavity 13. Further the oven pilot lamp 128 is energized across the conductor 127 and the neutral conductor N so as to indicate that the oven 10 is operating as an electric oven.

As the baking operation proceeds, the temperature in the heating cavity 13 rises to that preselected by the manual dial 122, whereby the temperature sensing bulb 27 opens the temperature switch (not shown), housed in the casing, thereby to interrupt the previously mentioned circuits for energizing the heating units 25 and 26. The temperature in the heating cavity 13 then subsides, whereby the temperature sensing bulb 27 recloses the temperature switch mentioned, thereby to recomplete the previously mentioned circuits for energizing the heating units 25 and 26.

The baking operation continues in the heating cavity 13 until the manual dial 122 is returned back into its "off" position; whereby the power switch mentioned is actuated to disconnect the line conductors L1 and L2 and the neutral conductor N from the conductors 127, 126 and 125 so as to deenergize the heating units 25 and 26 and to extinguish the oven pilot lamp 128.

Considering now the carrying out of a conventional broiling operation in the range 10, the cook places the food to be cooked in the upper portion of the heating unit 25 and then rotates the manual dial 122 of the oven switch and temperature controller 121 out of its "off" position through its variable "bake" position and into its "broil" position. This operation of the manual dial 122 actuates the power switch, not shown, housed in the casing, whereby the line conductors L1 and L2 are respectively connected to the conductors 127 and 125, with the result that the upper heating unit 25 is energized across the 236 volts of the Edison network and the lower heating unit 26 is deenergized. Further, the oven pilot lamp 128 is energized across the conductor 127 and the neutral conductor N so as to indicate that the oven 10 is operating upon an electric basis.

The broiling operation continues in the heating cavity 13 until the manual dial 122 is returned back into its "off" position; whereby the power switch mentioned is actuated to disconnect the line conductors L1 and L2 from the conductors 127 and 125 so as to deenergize the upper heating unit 25 and to extinguish the oven pilot lamp 128.

Prior to consideration of the carrying out of an electronic cooking operation in the heating cavity 13, it is well to consider the general mode of operation of the voltage multiplier and rectifier circuit 210, and it is pointed out that when low frequency A.C. potentials are applied to the input terminals 211, 212 and 213 thereof, a D.C. potential is presented across the output terminals 214 and 215 thereof.

More particularly, when the power selector switch 140 occupies its "high" position, the line conductor L1 is connectible to the input terminals 211 and 213 and the line conductor L2 is connectible to the input terminal 212. In the positive loops of the A.C. input voltage, the diode R2 is in a blocking condition, while the diode R1 is in a conducting condition. Accordingly, the capacitor C1 is charged via a circuit extending from the input terminal 211, the conductor 218, the diode R1, the conductor 219, the capacitor C1, the conductor 223, the surge limiting resistor 216, the conductor 224, the fuse 217 and the conductor 225 to the input terminal 212. In the negative loops of the input A.C. voltage, the diode R1 is in a blocking condition, while the diode R2 is in a conducting condition. Accordingly, the capacitor C2 is charged via a circuit extending from the input terminal 212, the conductor 225, the fuse 217, the conductor 224, the surge limiting resistor 216, the conductor 223, the capacitor C2, the conductor 221, the diode R2 and the conductor 220 to the input terminal 213. Specifically, the capacitor C1 is charged to a voltage only somewhat lower than the peak voltage of the input A.C. voltage; which, in the present case, is the L1 to L2 peak voltage that is double the L1 to N peak voltage. Specifically, the capacitor C2 is charged to a voltage only somewhat lower than the peak voltage of the input A.C. voltage; which, in the present example, is the L1 to L2 peak voltage that is double the L1 to N peak voltage. Since the two capacitors C1 and C2 are bridged in series relation via the conductors 219, 223 and 221 across the output terminals 214 and 215, the resulting D.C. voltage across the output terminals 214 and 215 is only somewhat lower than quadruple the peak voltage L to N and somewhat higher than quadruple the R.M.S. voltage L to N.

More particularly when the power selector switch 140 occupies its "low" position, the line conductor L1 is connectible to the input terminal 211, the line conductor L2 is connectible to the input terminal 212, and the neutral conductor N is connectible to the input terminal 213. In the positive loops of the A.C. voltage, the diode R2 is in a blocking condition, while the diode R1 is in a conducting condition. Accordingly, the capacitor C1 is charged via a circuit extending from the input terminal 211, the conductor 218, the diode R1, the conductor 219, the capacitor C1, the conductor 223, the surge limiting resistor 216, the conductor 224, the fuse 217 and the conductor 225 to the input terminal 212. In the negative loops of the input A.C. voltage, the diode R1 is in a blocking condition, while the diode R2 is in a conducting condition. Accordingly, the capacitor C2 is charged via a circuit extending from the input terminal 212, the conductor 225, the fuse 217, the conductor 224, the surge limiting resistor 216, the conductor 223, the capacitor C2, the conductor 221, the diode R2 and the conductor 220 to the input terminal 213. Specifically, the capacitor C1 is charged to a voltage only somewhat lower than the peak voltage of the input A.C. voltage; which, in the present case, is the L1 to L2 peak voltage that is double the L1 to N peak voltage. Specifically, the capacitor C2 is charged to a voltage only somewhat lower than the peak voltage of the input A.C. voltage; which, in the present example, is the L2 to N peak voltage. Since the two capacitors C1 and C2 are bridged in series relation via the conductors 219, 223 and 221 across the output terminals 214 and 215, the resulting D.C. voltage across the output terminals 214 and 215 is only somewhat lower than triple the peak voltage L to N and somewhat higher than triple the R.M.S. voltage L to N.

In this connection, it will be recalled that in an A.C. supply source, the peak voltage is about 141% of the R.M.S. voltage and that it is the R.M.S. voltage that is normally referred to in the rating of the A.C. supply source. Thus, the A.C. supply source having the R.M.S. voltages of 118/236 volts has the peak voltages of approximately 166/332. Accordingly, in the voltage multiplier and rectifier circuit 210, the D.C. output voltage (open-circuit) across the output terminals 214 and 215 is approximately 664 volts when the power selector switch 140 occupies its "high" position and is approximately 498 volts when the power seelctor switch 140 occupies its "low" position. Under load conditions by the magnetron device 71, the D.C. voltages present across the output terminals 214 and 215 of the voltage multiplier and rectifier circuit 210 may be respectively approximately 600 volts and 440 volts with the power selector switch 140 in its respective "high" and "low" positions. These D.C. output voltages of 600 and 440 volts are somewhat lower than the corresponding open-circuit voltages mentioned above due to voltage drops across the surge limiting resistor 216, the diodes R1 and R2, etc.

Also, it is pointed out that the surge limiting resistor 216 prevents instantaneous charging of each of the capacitors C1 and C2 and thus prevents excessive instantaneous surge currents from being drawn by the circuit 210 from the A.C. input supply source; while the bleeder or stabilizer resistor 222 has an appropriate high resistance so as to stabilize the D.C. output voltage from the output terminals 214 and 215 of the circuit 210. The fuse 217 serves the purpose of opening the A.C. input circuit in the event the circuit 210 should draw an exceedingly high A.C. current due to a short-circuit upon the busses B+ and B− that are connected to the respective output terminals 214 and 215.

When the relatively high D.C. output voltage of 600 volts is supplied from the circuit 210 to the magnetron device 71, it oscillates to supply ultra-high frequency energy at about 915 mc. to the heating cavity 13, the R.F. power output of the magnetron device 71 being approximately 700 watts. On the other hand, when the relatively low D.C. voltage of 440 volts is supplied from the circuit 210 to the magnetron device 71, it oscillates to supply ultra-high frequency energy at about 915 mc. to the heating cavity 13, the R.F. power output of the magnetron device 71 being approximately 250 watts. Hence, the R.F. power that is supplied by the magnetron device 71 to the heating cavity 13 is preset by the position of the power selector switch 140, as explained above. Also, it is reiterated that the magnetron device is especially constructed and arranged so that it is characterized by stable and efficient operation with the relatively low D.C. plate voltages of 440 and 600 volts. Specifically, the magnetron device 71 has a continuous R.F. power rating of about 250 watts at the D.C. plate voltage of 440 volts and has a continuous R.F. power rating of about 700 watts at the D.C. plate voltage of 600 volts.

The carrying out of electronic cooking operations in the heating cavity 13 is conditioned upon maintaining the lower front panel 60 in its closed position with respect to the open lower front of the lower machinery compartment 40 in the cabinet 11, since the interlock switch 46 is maintained in its closed position only when the lower front panel 60 occupies its closed position noted. Also, the carrying out of electronic cooking operations in the heating cavity 13 is conditioned upon maintaining the front door 20 in its closed position so as to maintain the door switch 31 in its closed position in order to actuate the switch spring 175 into engagement with the switch spring 177, since the power supply to the input terminal 212 of the circuit 210 may be completed only when the door switch 31 occupies its closed position noted. Also, it is mentioned that when the front door 20 is operated into its open position, the door switch 31 is actuated to open the switch spring 175 from the switch spring 177 and to close the switch spring 175 to the switch spring 176. Closure of the switch spring 175 to the switch spring 176 in the door switch 31 completes a circuit, including the conductors 178 and 231, as well as the contact bridging member 133, for illuminating the oven lamp 33 across the line conductor L2 and the neutral conductor N, which illumination of the oven lamp 33 is useful to the cook in viewing the interior of the heating cavity 13, incident to the placement and the removal of food with respect thereto.

Now considering the carrying out of an electronic cooking operation in the heating cavity 13 at the low rate of R.F. power supply thereto, the cook first places the food to be cooked into the heating cavity 13 and supported by the turntable 41 and then returns the front door 20 into its closed position. Next, the cook rotates the manual dial 142 of the power selector switch 140 from its "off" position into its "low" position; whereby the insulator 144 carried by the operating shaft 141 of the power selector switch 140 closes the switch spring 146 to the switch spring 145 and closes the switch spring 148 to the switch spring 147. Closure of the switch spring 148 to the switch spring 147 connects the neutral conductor N to the conductor 236, and consequently to the input terminal 213 of the circuit 210. Closure of the switch spring 146 to the switch spring 145 connects the conductor 238 to the conductor 239 and consequently to the input terminal 212 of the circuit 210. At this time, the input terminal 211 of the circuit 210 is connected via the conductor 235 and the contact bridging member 134 of the interlock switch 46 in its closed position to the line conductor L1.

Finally, the cook determines the time interval during which the food is to be cooked and then rotates the manual dial 162 of the program controller 160 out of its "0" time position into its corresponding preset time position, such, for example, as the "10-min." position thereof. When the manual dial 162 of the program controller 160 is thus rotated into its preset time position, the insulating cam 164 closes the switch spring 171 to the switch spring 172 and the insulating cam 165 closes the switch spring 173 to the switch spring 174. Closure of the switch springs 171, 172 connects the conductor 231 to the conductor 232, thereby to complete an obvious circuit for operating the electric motor 75 for driving the fan 74 that is operatively associated with the magnetron device 71 so as to initiate cooling thereof in the manner previously explained. Also, the conductor 232 is connected via the magnetron thermostatic switch 115 in its closed position to the conductor 240, thereby completing a path, including the closed switch springs 193 and 195 of the restored power relay 190 to the conductor 243, which path is extended via the resistor 138 and the contact 139 to the conductor 245, thereby to complete a circuit for energizing the lower section of the primary winding 251 of the cathode heater transformer 250. When the lower section of the primary winding 251 of the transformer 250 is thus energized, an A.C. voltage is induced into the secondary winding 252 thereof, thereby to complete a connection, including the conductor 254 to the terminals 105 and 106 of the magnetron device 71 across which the cathode heater 102 is bridged; whereby the cathode heater 103 is heated so as to render electron-emissive the cathode 102 of the magnetron device 71.

Also, the application of potential to the conductor 240 completes an obvious circuit for energizing the winding of the time delay relay 180, whereby the latter relay begins to operate; and after a time interval of about 45 seconds, the time delay relay 180 operates fully, the delay in the full operation of the time delay relay 180 being effected by the dash pot 183 that is operatively associated with the switch spring 181. Upon full operation of the time delay relay 180, the switch spring 181 is closed to the switch spring 182, thereby to apply potential to the conductor 233. The application of potential to the conductor 233 completes an obvious circuit for energizing the timer motor 166 of the program controller 160, whereby the previously described timed operation of the program controller 160 is initiated, with the result that the manual dial 162 is returned step-by-step in the counterclockwise direction and ultimately back into its "0" time position. Also the connection of potential to the conductor 233 effects the connection of potential to the conductor 234, since the switch spring 173 engages the switch spring 174 at this time. The connection of potential to the conductor 234 completes an obvious circuit for operating the motor 44 so as to effect rotation of the turntable 41, so that the supported food in the heating cavity 13 is rotated, for a purpose more fully explained hereinafter. Also, the connection of potential to the conductor 234 completes an obvious circuit for illuminating the U.H.F. pilot lamp 135, thereby to indicate that the heating cavity 13 is operating upon an electronic cooking basis at this time.

Finally, the connection of potential to the conductor 234 completes an obvious circuit for energizing the winding of the power relay 190, thereby to cause the latter relay to operate. Upon operating, the power relay 190 actuates the switch spring 193 to disengage the switch spring 195, thereby to interrupt the previously traced circuit for energizing the lower section of the primary winding 251 of the transformer 250; and actuates the switch spring 193 into engagement with the switch spring 194 so as to complete an alternative circuit including the conductor 241, the resistor 136 and the contact 137, the conductor 242, the closed switch springs 201 and 202 and the conductor 244 for energizing the full primary winding 251 of the transformer 250. When the full primary winding 251 of the transformer 250 is thus energized, a lower A.C. voltage is induced in the secondary winding 252 thereof so as to decrease the heating current supplied to the cathode heater 103. Finally upon operating the power relay 190 actuates the switch spring 191 to engage the switch spring 192, thereby to connect the conductor 255 to the conductor 238 and thus to the input terminal 212 of the circuit 210.

Accordingly, at this time, in the circuit 210, the input terminal 211 is connected to the line conductor L1, the input terminal 212 is connected to the line conductor L2 and the input terminal 213 is connected to the neutral conductor N, whereby the 440 volts D.C. is present across the output terminals 214 and 215 of the circuit 210 that are respectively connected to the B+ conductor and to the B— conductor. The B+ conductor is connected via the coils 118 and 119 and the conductor 226 to the terminal 104 of the magnetron device 71 and thus to the anode 101 thereof; while the B— conductor is connected directly to the terminal 105 of the magnetron device 71 and thus to the cathode 102 thereof. Accordingly, the 440 volts D.C. is impressed between the anode 101 and the cathode 102 of the magnetron device 71, whereby the same oscillates at the ultra-high frequency of 915 mc. and the coils 118 and 119 of the magnetron device 71 are energized in series in the plate circuit. Upon operating, the magnetron device 71 suplies the R.F. output to the output terminals 107 and 108 thereof; the output terminal 107 is capacitively coupled by the capacitor 109 to the inner conductor 81 of the transmission line 80; and the output terminal 108 is capacitively coupled by the capacitor 110 to the outer conductor 82 of the transmission line 80. As previously explained, the inner conductor 81 is connected to the antenna 36 and the outer conductor 82 is connected to the metal liner 12, whereby the R.F. energy is radiated by the antenna 36 into the heating cavity 13, with the result that decimeter standing waves are present in the heating cavity 13 and subject to electronic cooking the food that is supported by the rotating turntable 41. The heating cavity load is represented at 13L as being connected between the antenna 36 and the metal liner 12, the metal liner 12 being connected to the grounded neutral conductor N. The rotation of the food undergoing the electronic cooking operation by the supporting turntable 41 distributes the electronic heating effects therein so as to cause substantial uniform cooking of the food in the heating cavity 13, not withstanding spatial variations of the energy in the decimeter standing waves in the heating cavity 13.

The R.F. power is supplied at the low rate of about 250 watts from the magnetron device 71 into the heating cavity 13 at this time by virtue of the connection to the plate circuit of the relatively low D.C. voltage of 440 volts from the output terminals 214 and 215 of the circuit 210, since the power selector switch 140 occupies its "low" position at this time.

The electronic cooking operation continues under the control of the program controller 160; and at the expiration of the preset time interval of ten minutes, the timer motor 166 returns the manual dial 162 back into its "0" time position, whereupon the insulating cam 164 actuates the switch spring 171 to disengage the switch spring 172 and the insulating cam 165 actuates the switch spring 173 to disengage the switch springs 174. Opening of the switch springs 171, 172 disconnects potential from the conductor 232, thereby to arrest operation of the fan motor 75, to deenergize the primary winding 251 of the cathode heater transformer 250, and to deenergize the winding of the time delay relay 180. Accordingly, the time delay relay 180 immediately restores to actuate the switch spring 181 to disengage the switch spring 182, thereby to remove potential from the conductors 233 and 234. The removal of potential from the conductor 234 interrupts the circuit for energizing the winding of the power relay 190 so as to cause the latter relay to restore. Also, the removal of potential from the conductor 234 extinguishes the U.H.F. pilot lamp 135 and interrupts the circuit for operating the turntable motor 44. The removal of potential from the conductor 234 interrupts the circuit for operating the timer motor 166, thereby to arrest operation of the program controller 160 with the manual dial 162 in the "0" time position thereof. When the U.H.F. pilot lamp 135 is extinguished, it indicates that the heating cavity 13 is no longer operating on an electronic heating basis.

Upon restoring, the power relay actuates the switch spring 191 from engagement with the switch spring 192, thereby to interrupt the power supply to the circuit 210 and consequently the supply of D.C. power to the magnetron device 71, with the result that the magnetron device 71 stops oscillating and interrupts the supply of R.F. energy to the antenna 36 in the heating cavity 13. At this time, the electronic cooking operation at the low rate has been completed in the heating cavity 13.

Now considering the carrying out of an electronic cooking operation in the heating cavity 13 at the high rate of R.F. power supply thereto, the cook first places the food to be cooked into the heating cavity 13 and supported by the turntable 41, and then returns the front door 20 into its closed position. Next, the cook rotates the manual dial 142 of the power selector switch 140 from its "off" position into its "high" position; whereby the insulator 144 carried by the operating shaft 141 of the power selector switch 140 closes the switch spring 149 to the switch spring 150, closes the switch spring 151 to the switch spring 152, and closes the switch spring 153 to the switch spring 154. At this time, the conductor 235 terminated by the input terminal 211 of the circuit 210 is connected to the line conductor L1; whereby closure of the switch spring 149 to the switch spring 150 connects the conductor 235 to the conductor 236 so as to connect the line conductor L1 to the input terminal 213 of the circuit 210. Finally, the cook determines the time interval during which the food is to be cooked and then rotates the manual dial 162 of the program controller 160 out of its "0" time position into its corresponding preset time position, such, for example, as the "10-min." position thereof. When the manual dial 162 of the program controller 160 is thus rotated into its preset time position, the insulating cam 164 closes the switch spring 171 to the switch spring 172 and the insulating cam 165 closes the switch spring 173 to the switch spring 174. Closure of the switch springs 171, 172 connects the conductor 231 to the conductor 232, thereby to complete an obvious circuit for operating the electric motor 75 for driving the fan 74 that is operatively associated with the magnetron device 71 so as to initiate cooling thereof in the manner previously explained. Also, the conductor 232 is connected via the magnetron thermostatic switch 115 in its closed position to the conductor 240, thereby completing a path including the closed switch springs 193 and 195 of the restored power relay 190 to the conductor 243; which path is extended via the resistor 138 and the contact 139 to the conductor 245, thereby to complete a circuit for energizing the lower section of the primary winding 251 of the cathode heater transformer 250. When the lower section of the primary winding 251 of the transformer 250 is thus energized, an A.C. voltage is induced in a secondary winding 252 thereof, thereby to complete a connection, including the conductor 254, to the terminals 105 and 106 of the magnetron device 71 across which the cathode heater 103 is bridged; whereby the cathode heater 103 is heated so as to render electron-emissive the cathode 102 of the magnetron device 71.

Also, the application of potential to the conductor 240 completes an obvious circuit for energizing the winding of the time delay relay 180, whereby the latter relay begins to operate; and after a time interval of about 45 seconds, the time delay relay 180 operates fully, the delay in the full operation of the time delay relay 180 being effected by the dash pot 183 that is operatively associated with the switch spring 181. Upon full operation of the time delay relay 180, the switch spring 181 is closed to the switch spring 182, thereby to supply potential to the conductor 233. The application of potential to the conductor 233 completes an obvious circuit for energizing the timer motor 166 of the program controller 160, whereby the previously described timed operation of the program controller 160 is initiated, with the result that the manual dial 162 is returned step-by-step in the counterclockwise direction and ultimately back into its "0" time position. Also, the connection of potential to the conductor 233 effects the connection of potential to the conductor 234, since the switch spring 173 engages the switch spring 174 at this time. The connection of potential to the conductor 234 completes an obvious circuit for operating the motor 44 so as to effect rotation of the turntable 41, so that the supported food in the heating cavity 13 is rotated for a purpose more fully explained hereinafter. Also, the connection of potential to the conductor 234 completes an obvious circuit for illuminating the U.H.F. pilot lamp 135, thereby to indicate that the heating cavity 13 is operated upon an electronic cooking basis at this time.

Further, the connection of potential to the conductor 234 completes the path including the closed switch springs 154 and 153 for connecting potential to the conductor 237, thereby to complete an obvious circuit for energizing the winding of the cathode heater relay 200, so as to cause the latter relay to operate. Upon operating, the cathode heater relay actuates the switch spring 201 to disengage the switch spring 202, so as to open a point in the circuit for energizing the full primary winding 251 of the cathode heater transformer 250, for a purpose more fully explained subsequently. Finally, the connection of potential to the conductor 243 completes an obvious circuit for energizing the winding of the power relay 190, thereby to cause the latter relay to operate. Upon operating, the power relay 190 actuates the switch spring 193 to disengage the switch spring 195, thereby to interrupt the previously traced circuit for energizing the lower section of the primary winding 251 of the transformer 250; and actuates the switch spring 193 into engagement with the switch spring 194 so as to prepare an alternative circuit for energizing the full primary winding 251 of the transformer 330. However, the last mentioned circuit is not completed at this time, by virtue of the operated position of the cathode heater relay 200 actuating the switch spring 201 into disengagement with the switch spring 202. More particularly, the circuit mentioned for energizing the full primary winding 251 is not completed at this time by virtue of the "high" position of the power selector switch 140, since it is not necessary to energize the cathode heater 103 when the magnetron device 71 is operated at high power, as the cathode 102 is rendered electron-emissive at high power incident to normal operation thereof. Finally, upon operating the power relay 190 actuates the switch spring 191 to engage the switch spring 192, thereby to connect the conductor 255 to the conductor 238 and thence to the conductor 239 and thus to the input terminal 212 of the circuit 210.

Accordingly, at this time, in the circuit 210, both of the input terminals 211 and 213 are connected to the line conductor L1 and the input terminal 212 is connected to the line conductor L2, whereby the 600 volts D.C. is present across the output terminals 214 and 215 of the circuit 210 that are respectively connected to the B+ conductor and to the B− conductor. The B+ conductor is connected via the coils 118 and 119 and the conductor 226 to the terminal 104 of the magnetron device 71 and thus to the anode 101 thereof. While the B− conductor is connected directly to the terminal 105 of the magnetron device 71 and thus to the cathode 102 thereof. Accordingly, the 600 volts D.C. is impressed between the anode 101 and the cathode 102 of the magnetron device 71; whereby the same oscillates at the ultra-high frequency of 915 mc. and the coils 118 and 119 of the magnetron device 71 are energized in series relation in the plate circuit. Upon operating, the magnetron device 71 supplies the R.F. output to the output terminals 107 and 108 thereof; the output terminal 107 is capacitively coupled by the capacitor 109 to the inner conductor 81 of the transmission line 80; and the output terminal 108 is capacitively coupled by the capacitor 110 to the outer conductor 82 of the transmission line 80. As previously explained, the inner conductor 81 is connected to the antenna 36 and the outer conductor 82 is connected to the metal liner 12, whereby the R.F. energy is radiated by the antenna 36 into the heating cavity 13, with the result that decimeter standing waves are present in the heating cavity 13 and subject to an electronic cooking action the food that is supported by the rotating turntable 41. The heating cavity load is represented at 13L as being connected between the antenna 36 and the metal liner 12, the metal liner 12 being connected to the grounded neutral conductor N. The rotation of the food undergoing the electronic cooking operation by the supporting turntable 41 distributes the electronic heating effects herein so as to cause substantially uniform cooking of the food in the heating cavity 13, notwithstanding spatial variations of the energy in the decimeter standing waves in the heating cavity 13.

The R.F. power is supplied at the high rate of about 700 watts from the magnetron device 101 into the heating cavity 13 at this time, by virtue of the connection to the plate circuit thereof of the relatively high D.C. voltage of 600 volts from the output terminals 214 and 215 of the circuit 210, since the power selector switch 140 occupies its "high" position at this time.

The electronic cooking operation continues under the control of the program controller 160; and at the expiration of the preset time interval of ten minutes, the timer motor 166 returns the manual dial 162 back into its "0" time position, whereupon the insulating cam 164 actuates the switch spring 171 to disengage the switch spring 172 and the insulating cam 165 actuates the switch spring 173 to disengage the switch spring 174. Opening of the switch springs 171, 172 disconnects potential from the conductor 232, thereby to arrest operation of the fan motor 75 and to deenergize the winding of the time delay relay 180.

Accordingly, the time delay relay 180 immediately restores to actuate the switch spring 181 to disengage the switch spring 182, thereby to remove potential from the conductors 233, and 234. The removal of potential from the conductor 234 interrupts the circuits for energizing the windings of the power relay 190 and the cathode heater relay 200 so as to cause these relays to restore. Also, the removal of potential from the conductor 234 extinguishes the U.H.F. pilot lamp 135 and interrupts the circuit for operating the turntable motor 44. The removal of potential from the conductor 233 interrupts the circuit for operating the timer motor 166, thereby to arrest operation of the program controller 160 with the manual dial 162 in the "0" time position thereof. When the U.H.F. pilot lamp is extinguished, it indicates that the heating cavity 13 is no longer operating upon an electronic heating basis. Upon restoring, the power relay 190 actuates the switch spring 191 from engagement with the switch spring 192, thereby to interrupt the power supply to the circuit 210 and consequently the supply of D.C. power to the magnetron device 71, with the result that the magnetron device 71 stops oscillating and interrupts the supply of the R.F. energy to the antenna 36 and the heating cavity 13. At this time, the electronic cooking operation at the high rate has been completed in the heating cavity 13.

The carrying out of the electronic cooking operations respectively at the low power rate and at the high power rate in the heating cavity 13, as described above, are conditioned upon the magnetron thermostatic switch 115 remaining in its closed position, indicating that the magnetron device 71 is operated at a temperature within the normal range of operating temperatures thereof. More particularly, in the event of an abnormally high operating temperature of the magnetron device 71, notwithstanding the operation of the fan 74 by the fan motor 75 for the cooling purpose, the fins 111 are heated to an abnormally high temperature, with the result that the magnetron thermostatic switch 115 is operated into its open position. More specifically, the thermostatic element 116 of the magnetron thermostatic switch 115 is moved to disengage the associated switch spring 117, thereby to disconnect the conductor 232 from the conductor 240. When potential is thus removed from the conductor 240, the previously traced circuit for energizing the winding of the time delay relay 180 is interrupted, whereby the latter relay restores. Upon restoring, the time delay relay 180 actuates the switch spring 181 to disengage the switch spring 182 so as to effect the removal of potential from the conductor 233 and consequently from the conductor 234, notwithstanding the circumstance that the program controller 160 occupies a position other than its "0" time position. The removal of potential from the conductor 233 arrests operation of the timer motor 166 so as to arrest further return, at this time, of the program controller 160 back toward its "0" time position. The removal of potential from the conductor 234 interrupts the previously traced circuit for retaining operated the power relay 190; whereby the latter relay restores to actuate the switch spring 191 to disengage the switch spring 192 so as to interrupt the supply of power to the circuit 210, thereby to arrest operation of the magnetron device 71 and the consequent supply of R.F. energy to the heating cavity 13. Also the removal of potential from the conductor 234 effects the restoration of the cathode heater relay 200, in the event the latter relay occupies its operated position, extinguishes the U.H.F. pilot lamp 135 and arrests operation of the turntable motor 44.

Since operation of the magnetron device 71 is arrested at this time, the temperature of the same subsides, whereby the magnetron switch 115 is subsequently reoperated back into its closed position so as to effect the return of potential to the conductor 240. The return of potential to the conductor 240 again effects energization of the lower section of the primary winding 251 of the cathode heater transformer 250 and causes the time delay relay 180 to operate after the time delay of about 45 seconds, in the manner previously explained. Upon reoperating, the time delay relay 180 effects the return of potential upon the conductor 233 and consequently upon the conductor 234; the return of potential upon the conductor 233 initiates further operation of the timer motor 166 of the program controller 160. The return of potential upon the conductor 234 illuminates the U.H.F. pilot lamp 135, effects further operation of the turntable motor 44, and brings about reoperation of the power relay 190 and causes reoperation of the cathode heater relay 200, in the event the power selector switch 140 occupies its "high" position at this time. Upon reoperation, the power relay 190 actuates the switch spring 191 into engagement with the switch spring 192 so as to effect further operation of the circuit 210 and the consequent reoperation of the magnetron device 71 to supply R.F. energy to the heating cavity 13. Also, the power relay 190 actuates the switch spring 193 to engage the switch spring 194, whereby the full primary winding 251 of the transformer 250 is energized, in the event the power selector switch 140 occupies its "low" position. On the other hand, in the event the power selector switch 140 occupies its "high" position, the operated cathode heater relay 200 prevents energization of the primary winding 150 of the transformer 250, in the manner previously explained.

The carrying out of electronic cooking operations respectively at the low power rate and at the high power rate in the heating cavity 13, as described above, are conditioned upon the door switch 31 remaining in its closed position; and should the cook operate the front door 20 into its open position at this time, the door switch 31 is actuated to move the switch spring 175 into disengagement with the switch spring 177, so as to remove potential from the conductor 255. The removal of potential from the conductor 255 effects removal of potential from the conductor 233 and consequently from the conductor 234.

The removal of potential from the conductor 233 arrests operation of the timer motor 166 so as to arrest further return at this time of the program controller 160 back toward its "0" time position. The removal of potential from the conductor 234 interrupts the previously traced circuit for retaining operated the power relay 190, whereby the latter relay restores to actuate the switch spring 191 to disengage the switch spring 192 so as to interrupt the supply of power to the circuit 210, thereby to arrest operation of the magnetron device 71 and the consequent supply of R.F. energy to the heating cavity 13. Also the removal of potential from the conductor 234 effects the restoration of the cathode heater relay 200, in the event the latter relay occupies its operated position, extinguishes the U.H.F. pilot lamp 135 and arrests operation of the turntable motor 44.

Subsequently, when the cook returns the front door 20 back into its closed position, the door switch 31 is actuated to move the switch spring 175 into engagement with the switch spring 177, with the result that potential is returned upon the conductor 255, and consequently upon the conductors 233 and 234. The return of potential upon the conductor 233 initiates further operation of the timer motor 166 of the program controller 160. The return of potential upon the conductor 234 illuminates the U.H.F. pilot lamp 135, effects operation of the turntable motor 44, and brings about reoperation of the power relay 190, and causes reoperation of the cathode heater relay 200, in the event the power selector switch 140 occupies its "high" position at this time. Upon reoperation, the power relay 190 actuates the switch spring 191 into engagement with the switch spring 192 so as to effect further operation of the circuit 210 and the consequent reoperation of the magnetron device 71 to supply R.F. energy to the heating cavity 13. Also, the power relay 190 actuates the switch spring 193 to disengage the switch spring 195 so as to interrupt the circuit for energizing the lower section of the primary winding 251 of the transformer 250. Further, the power relay 190 actuates the switch spring 193 to engage the switch spring 194, whereby the full primary winding 251 of the transformer 250 is energized in the event the power selector switch 140 occupies its "low" position. On the other hand, in the event the power selector switch 140 occupies its "high" position, the operated cathode heater relay 200 prevents energization of the primary winding 251 of the transformer 250, in the manner previously explained.

At any time that it is necessary for the repairman to make inspection or adjustment of the apparatus housed in the lower machinery compartment 40, the lower front panel 60 may be removed so as to bring about operation of the interlock switch 46 into its open position so as positively to prevent operation of the circuit 210 and the magnetron device 71 at this time. Also to insure that there is no residual voltage across the B+ conductor and the B— conductor, the repairman may actuate the shorting switch 230 into its closed position, thereby to short-circuit the anode 101 to the cathode 102 of the magnetron device 71 and to short-circuit the conductor 226 to the B— conductor and effectively short-circuit through the coils 118 and 119 the B+ conductor to the B— conductor. Thereafter, when the repairman has made his inspection or adjustment of the apparatus housed in the lower machinery compartment 40, the shorting switch 230 is returned into its normal open position and the lower panel 60 is returned into its normal position closing the open front of the lower machinery compartment 40, with the result that the interlock switch 46 is returned back into closed position so as again to condition for further operation the circuit 210 and the magnetron device 71.

Alternatively, the shorting switch 230 may be interlocked with the hinge mechanism for the front door 20, so that when the front door 20 is moved into its open position, the shorting switch 230 is moved into its closed position, and so that when the front door 20 is moved into its closed position, the shorting switch 230 is moved into its open position. Of course, this arrangement positively prevents operation of the magnetron device 71 when the front door 20 occupies its open position.

In view of the foregoing, it is apparent that there has been provided an improved control and power supply system for the magnetron device that is of improved connection and arrangement and that insures the supply of an adequate high plate voltage to the magnetron device to supply R.F. power at a high rate to the associated cooking cavity for the purpose of carrying out cooking operations therein at a corresponding high rate and that insures the supply of adequate low plate voltage to the magnetron device to effect operation thereof to supply R.F. power at a low rate to the associated cooking cavity for the purpose of carrying out cooking operations therein at a corresponding low rate.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. An ultra-high frequency generator comprising a 3-wire Edison A.C. supply source of low frequency including a pair of ungrounded line conductors and a grounded neutral conductor, wherein the amplitude of the peak voltage line-to-neutral of said source is approximately V and the amplitude of the peak voltage line-to-line of said source is approximately 2V, a voltage multiplier and rectifier circuit including three input terminals and a pair of output terminals, a first connection between a first of said circuit input terminals and one of said line conductors, a second connection between a second of said circuit input terminals and the other of said line conductors, a power selector switch having a high position and a low position, said power selector switch in its high position completing a third connection between a third of said circuit input terminals and said one line conductor and in its low position completing a fourth connection between said third circuit input terminal and said neutral conductor, said circuit being characterized by the production of a D.C. output voltage across the output terminals thereof having an amplitude of approximately 4V in response to the completion of said third connection and by the production of a D.C. output voltage across the output terminals thereof having an amplitude of approximately 3V in response to the completion of said fourth connection, a magnetron including a pair of input terminals and a pair of output terminals, and additional connections between said circuit output terminals and said magnetron input terminals, said magnetron being characterized by the production of an A.C. voltage of ultra-high frequency across the output terminals thereof in response to the application of a D.C. voltage across the input terminals thereof, said magnetron being further characterized by the delivery of relatively high R.F. power from the output terminals thereof in response to the application of said D.C. voltage of 4V across the input terminals thereof and by the delivery of relatively low R.F. power from the output terminals thereof in response to the application of said D.C. voltage of 3V across the input terminals thereof.

2. The ultra-high frequency generator set forth in claim 1, wherein the amplitude of the peak voltage line-to-neutral of said source is approximately 141% of the R.M.S. voltage line-to-neutral thereof, and the R.M.S. voltage line-to-neutral of said source is in the general range 110 to 125 volts.

3. A power supply system for a magnetron; said system comprising a 3-wire Edison A.C. supply source of low frequency including a pair of ungrounded line conductors and a grounded neutral conductor, wherein the amplitude of the peak voltage line-to-neutral of said source is approximately V and the amplitude of the peak voltage line-to-line of said source is approximately 2V, a circuit network including three input terminals and a pair of output terminals for connection to a magnetron, a first connection between a first of said input terminals and a first of said line conductors, a second connection between a second of said input terminals and a second of said line conductors, and a selector switch having a high position and a low position, said selector switch in its high position completing a third connection between a third of said input terminals and said one line conductor and in its low position completing a fourth connection between said third input terminal and said neutral conductor, said circuit network also including a first rectifying circuit having the input thereof connected to said first and second input terminals and having an output, a second rectifying circuit having the input thereof connected to said second and third input terminals and having an output, the outputs of said rectifying circuits being bridged in series relation and connected between said pair of output terminals, whereby said circuit network is characterized by the production of a D.C. output voltage across said output terminals having an amplitude of approximately 4V in response to the completion of said third connection and by the production of a D.C. output voltage across said output terminals having an amplitude of approximately 3V in response to the completion of said fourth connection.

4. A power supply system for a magnetron; said system comprising a 3-wire Edison A.C. supply source of low frequency including a pair of ungrounded line conductors and a grounded neutral conductor, wherein the amplitude of the peak voltage line-to-neutral of said source is approximately V and the amplitude of the peak voltage line-to-line of said source is approximately 2V, a circuit network including three input terminals and a pair of output terminals for connection to a magnetron, a first connection between a first of said input terminals and a first of said line conductors, a second connection between a second of said input terminals and a second of said line conductors, and a selector switch having a high position and a low position, said selector switch in its high position completing a third connection between a third of said input terminals and said one line conductor and in its low position completing a fourth connection between said third input terminal and said neutral conductor, said circuit network further including a first diode poled in a first direction and connected between said first input terminal and a first of said output terminals, a second diode poled in a second direction and connected between said third input terminal and a second of said output terminals, and a pair of capacitors connected in series relation across said pair of output terminals, said second input terminal being connected to the junction between said pair of capacitors, whereby said first diode effects charging of a first of said capacitors to a D.C. voltage having an amplitude of approximately 2V, and said second diode effects charging of a second of said capacitors to a D.C. voltage having an amplitude of approximately 2V in response to the completion of said third connection and having an amplitude of approximately V in response to the completion of said fourth connection, with the result that the D.C. output voltage across said pair of output terminals is approximately 4V when said selector switch occupies its high position and is approximately 3V when said selector switch occupies its low position.

5. A power supply system for a magnetron; said system comprising a 3-wire Edison A.C. supply source of low frequency including a pair of ungrounded line conductors and a grounded neutral conductor, wherein the amplitude of the peak voltage line-to-neutral of said source is approximately V and the amplitude of the peak voltage line-to-line of said source is approximately 2V, a circuit network including three input terminals and a pair of output terminals for connection to a magnetron, a first connection between a first of said input terminals and a first of said line conductors, a second connection between a second of said input terminals and a second of said line conductors, and a third connection between a third of said input terminals and said neutral conductor, said circuit network also including a first rectifying circuit having the input thereof connected to said first and second input terminals and having an output, a second rectifying circuit having the input thereof connected to said second and third input terminals and having an output, the outputs of said rectifying circuits being bridged in series relation and connected between said pair of output terminals, whereby said circuit network is characterized by the production of a D.C. output voltage across said output terminals having an amplitude of approximately 3V.

6. A power supply system for a magnetron; said system comprising a 3-wire Edison A.C. supply source of low frequency including a pair of ungrounded line conductors and a grounded neutral conductor, wherein the amplitude of the peak voltage line-to-neutral of said source is approximately V and the amplitude of the peak voltage line-to-line of said source is approximately 2V, a circuit network including three input terminals and a pair of output terminals for connection to a magnetron, a first connection between a first of said input terminals and a first of said line conductors, a second connection between a second of said input terminals and a second of said line conductors, and a third connection between a third of said input terminals and said neutral conductor; said circuit network further including a first diode poled in a first direction and connected between said first input terminal and a first of said output terminals, a second diode poled in a second direction and connected between said third input terminal and a second of said output terminals, and a pair of capacitors connected in series relation across said pair of output terminals, said second input terminal being connected to the junction between said pair of capacitors, whereby said first diode effects charging of a first of said capacitors to a D.C. voltage having an amplitude of approximately 2V, and said second diode effects charging of a second of said capacitors to a D.C. voltage having an amplitude of approximately V, with the result that the D.C. output voltage across said pair of output terminals is approximately 3V.

7. The power supply system set forth in claim 6, wherein the amplitude of the peak voltage line-to-neutral of said source is approximately 141% of the R.M.S. voltage line-to-neutral thereof, and the R.M.S. voltage line-to-neutral of said source is in the general range 110 to 125 volts.

8. The power supply system set forth in claim 6, wherein each of said diodes is of the crystal type and each of said capacitors is of the electrolytic type.

9. The power supply system set forth in claim 6, wherein said circuit network further includes a current limiting impedance element arranged in said third connection so as to limit the instantaneous charging rate of each of said capacitors.

References Cited by the Examiner
UNITED STATES PATENTS

| | | | |
|---|---|---|---|
| 1,946,354 | 2/34 | McIlvaine | 328—262 |
| 2,441,005 | 5/48 | Bradford | 219—20.4 |
| 2,831,952 | 4/58 | Warner | 219—10.55 |
| 2,980,842 | 4/61 | Medlar | 317—234 |

DAVID J. GALVIN, *Primary Examiner.*

GEORGE N. WESTBY, *Examiner.*